Jan. 16, 1945. A. J. PFOHL ET AL Re 22,591

PIPE WRAPPING MACHINE

Original Filed Aug. 2, 1940 4 Sheets-Sheet 1

INVENTORS
ANTHONY J. PFOHL
CHARLES M. WOOD

BY

ATTORNEY.

Jan. 16, 1945. A. J. PFOHL ET AL Re 22,591

PIPE WRAPPING MACHINE

Original Filed Aug. 2, 1940 4 Sheets-Sheet 2

INVENTORS
ANTHONY J. PFOHL
CHARLES M. WOOD

BY

ATTORNEY.

Jan. 16, 1945. A. J. PFOHL ET AL Re 22,591

PIPE WRAPPING MACHINE

Original Filed Aug. 2, 1940 4 Sheets-Sheet 3

INVENTORS
ANTHONY J. PFOHL
CHARLES M. WOOD

BY

ATTORNEY.

Jan. 16, 1945. A. J. PFOHL ET AL Re 22,591

PIPE WRAPPING MACHINE

Original Filed Aug. 2, 1940 4 Sheets-Sheet 4

INVENTORS
ANTHONY J. PFOHL
CHARLES M. WOOD

BY

ATTORNEY.

Reissued Jan. 16, 1945

Re. 22,591

UNITED STATES PATENT OFFICE 22,591

PIPE WRAPPING MACHINE

Anthony J. Pfohl and Charles M. Wood, Lockland, Ohio, assignors to The Philip Carey Manufacturing Company, a corporation of Ohio Original No. 2,271,528, dated February 3, 1942, Serial No. 349,776, August 2, 1940. Application for reissue January 30, 1943, Serial No. 474,198

12 Claims. (Cl. 242—11)

This invention relates to wrapping bodies, more particularly substantially cylindrical bodies, such as pipes, conduits and the like, with a protective covering, such as flexible strips of woven or felted fabric. More specifically the invention pertains to movably supporting a supply roll or rolls of the covering material on the pipe or conduit line for being progressively actuated along the pipe or conduit line as the roll supply is helically applied around the line with the adjacent margins of the strip abutting or overlapped and rolled down to snugly and completely cover the pipe or conduit line.

The movable support for the supply rolls of covering material is connected with a frame whereby it may be advantageously driven by any suitable power unit, such as a motor or the like. The invention can be used for wrapping a pipe or conduit line with or without an adhesive coating material, such as asphalt or the like, applied between the wrapped covering and the bodies being wrapped.

For a better understanding of the invention, reference may be made to the accompanying drawings, in which.

Figure 1:
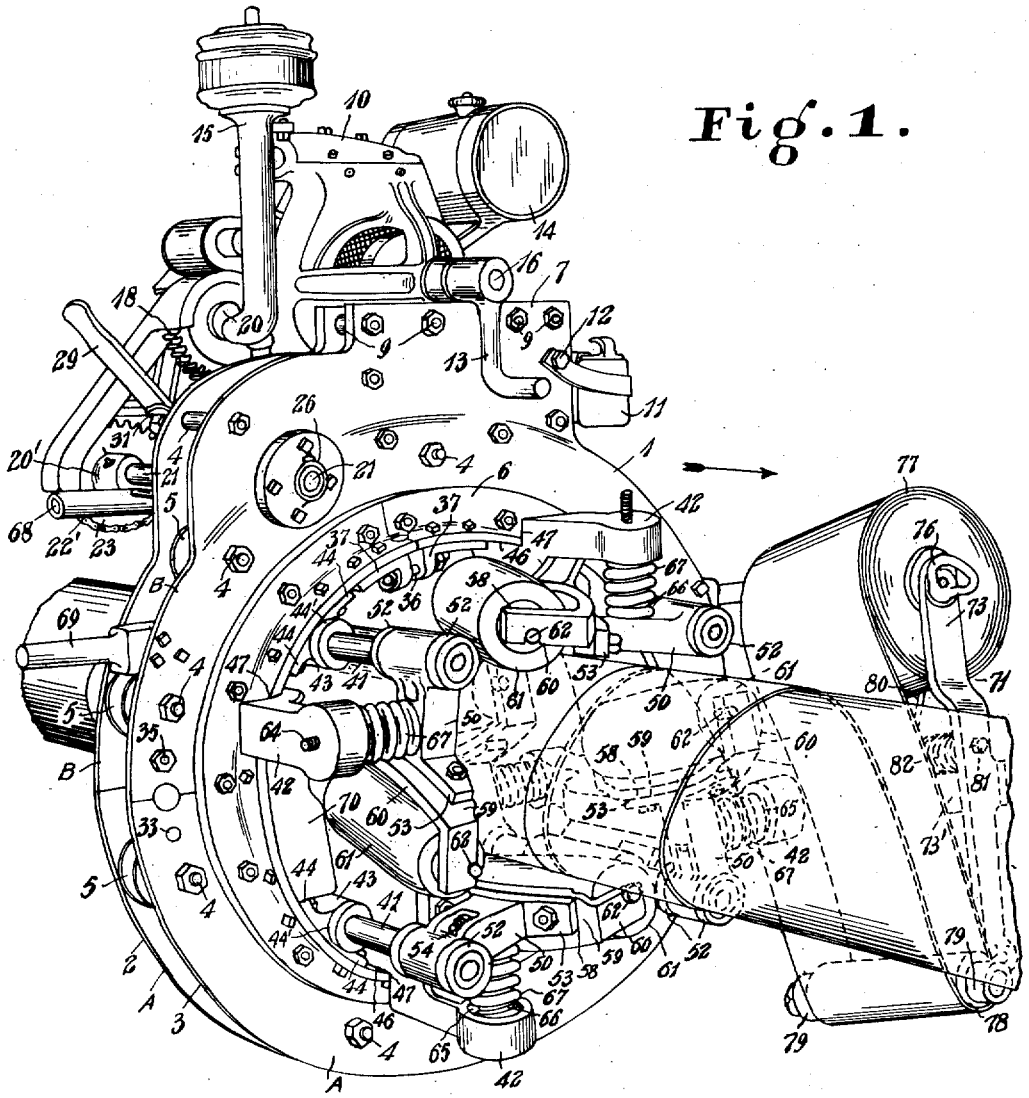
Fig. 1 is a right front perspective view of the wrapping device, looking at its advanced end, with a portion of pipe upon which the covering is being wrapped.
Figure 2:
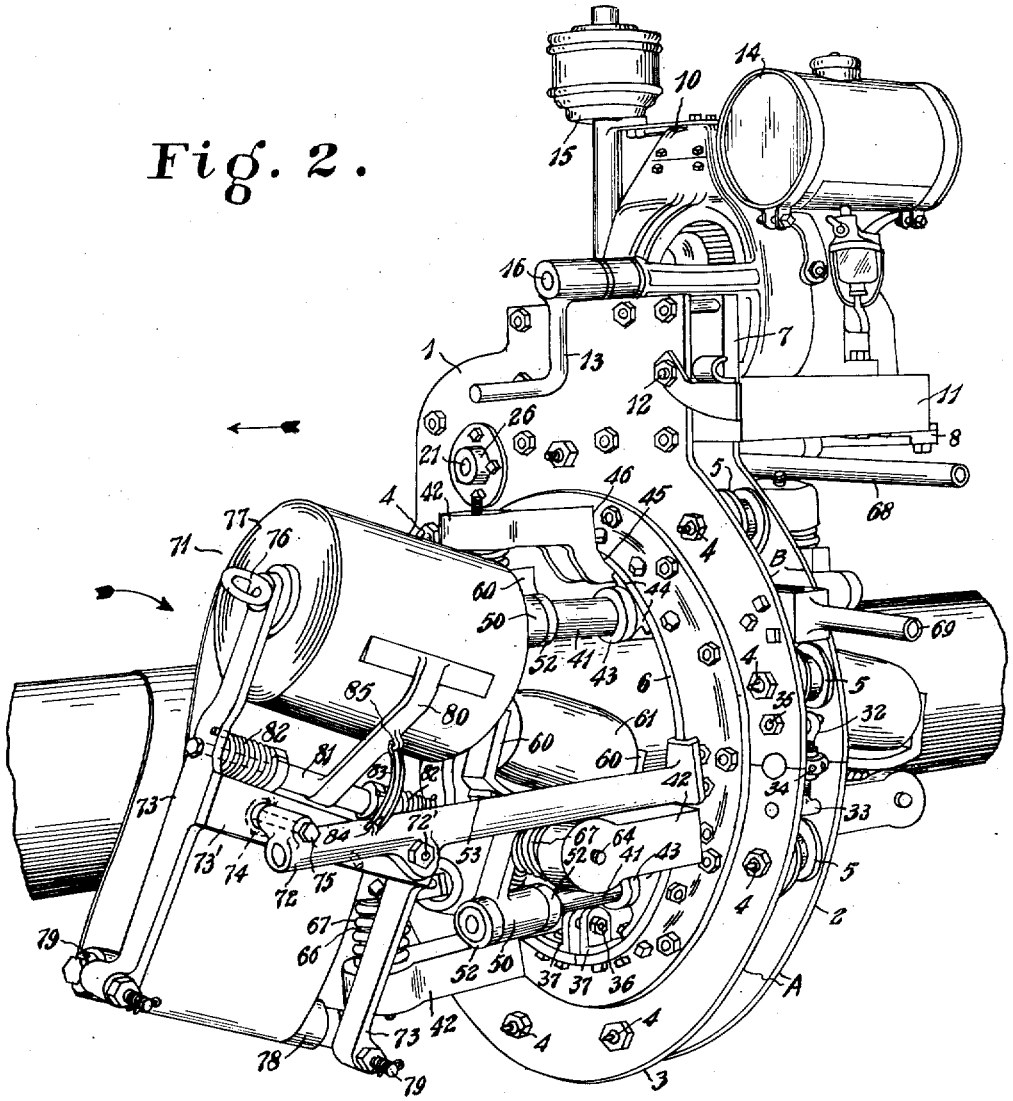
Fig. 2 is a left front perspective view of the same device, looking at said advanced end, with the said portion of pipe upon which the covering is being wrapped.
Figure 3:
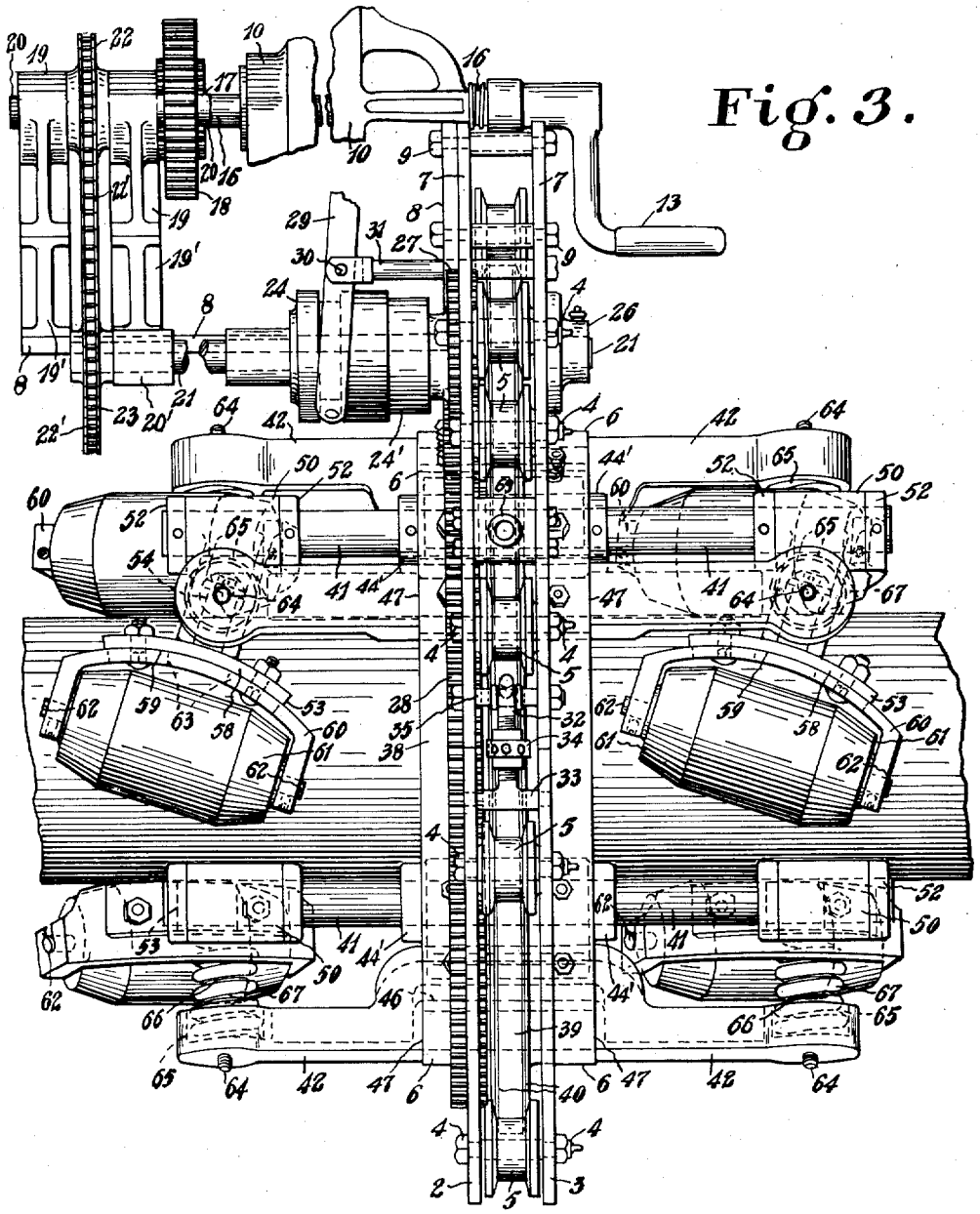
Fig. 3 is a side elevation of the device, with a portion of the pipe, and with only fragments of the motor or engine shown.
Figure 4:
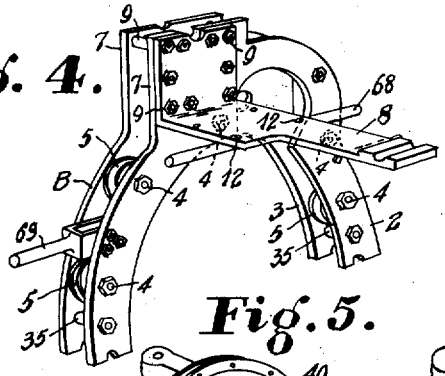
Fig. 4 is a rear perspective view, looking at the trailing end, of the upper section of the housing, with certain of the parts attached thereto.
Figure 8:
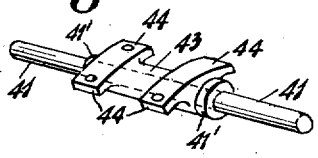
Fig. 8 is a detail perspective view of one of the roller arm bearings with the roller arm bar mounted therein.
Figure 5:
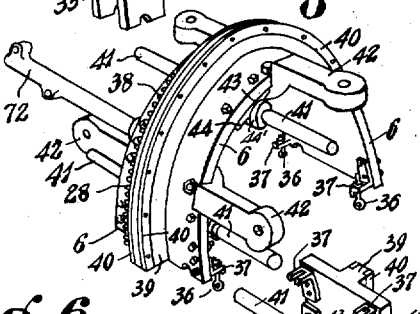
Fig. 5 is a like view of the upper section of the rotary ring, with certain of the parts attached thereto.
Figure 9:
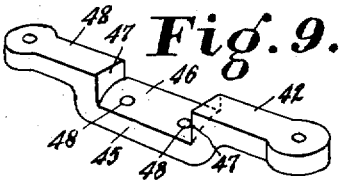
Fig. 9 is a like view of one of the spring arms.
Figure 10:
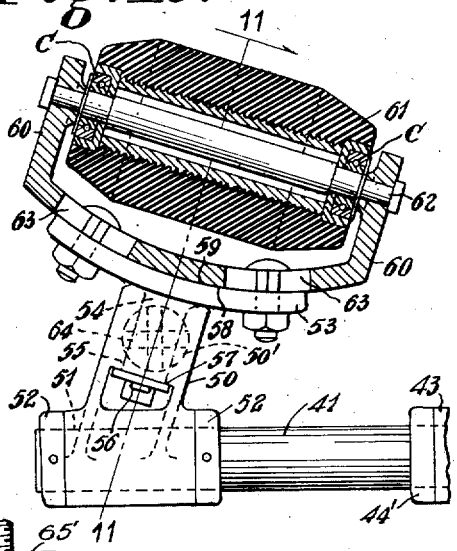
Fig. 10 is an axial section of one of the winding rollers and its yoke, with the yoke swivel and roller arm and part of the arm bar in plan.
Figure 6:
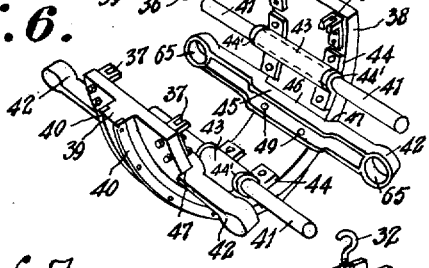
Fig. 6 is a like view of the lower section of said ring, with certain of the parts attached thereto.
Figure 7:
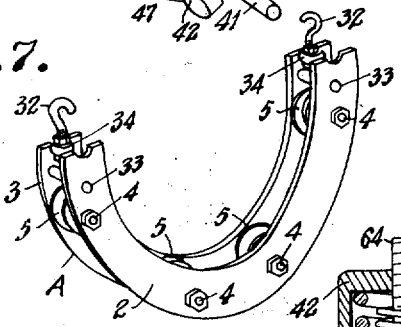
Fig. 7 is a like view of the lower section of the housing, with certain of the parts attached thereto.
Figure 11:
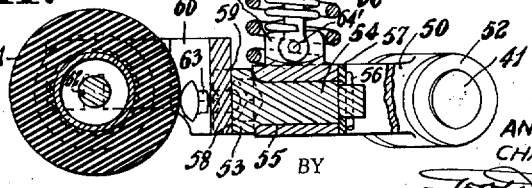
Fig. 11 is a section on the plane of the line 11—11 of Fig. 10, including the roller arm springs and the spring arm, with part of the roller arm in elevation.

Referring specifically to the drawings in which like numerals are used to designate like parts, the wrapping device comprises a housing or frame member 1 composed of annular rings 2 and 3 fastened together in spaced apart relation by bolts 4. The annular rings, for convenience in assembling the housing on a pipe line, may be divided into two or more segments or parts. Rollers 5 are disposed about the frame or housing member 1 and can be mounted on the bolts 4 in the space between the rings 2 and 3. Any number of these rollers 5 may be provided, but preferably five to ten of them are disposed as a raceway for rotatably supporting therein ring 6 hereinafter described. The tops of the two rings 2 and 3 forming the frame or housing member are advantageously provided with extensions or flanges 7 to which an angular bracket or shelf 8 may be bolted at 9 for mounting motor 10 and gear driving mechanism hereinafter described. A tool box 11 may advantageously be attached at 12 to frame member 1 to extend along one side edge of the shelf.

The motor is a conventional gas engine having a starting crank 13, gas tank 14, muffler 15, and a rotor shaft 16. Gear 17 is fixed to the end of the rotor shaft 16 and disposed to mesh with a gear 18 of a transmission mechanism connecting with gear mechanism hereinafter referred to.

Two spaced apart pedestals 19 are supported on the shelf 8, with raising blocks 19' disposed between the pedestals and the shelf. Journalled on these pedestals 19 is a jack shaft 20 to which is fixed the gear 18 and a sprocket 22. These pedestals are mounted near the outer end of the shelf on the portion of reduced width. At the outside corner of the shelf 8 a bearing 20' is bolted to journal an end of shaft 21 on which is fitted sprocket wheel 23. Sprocket chain 22' connects the sprocket wheels 22 and 23.

The end of shaft 21, opposite to that on which sprocket 23 is mounted, is journalled in the bearing 26 on the housing member 1. Gear 27 is on shaft 21 and arranged in position to mesh with the annular ear 28. A friction clutch comprising the parts 24 and 24' are operated to connect and disconnect the motor by means of clutch handle 29 pivoted at 30 upon the arm 31, projecting from and attached to the frame member 1. The clutch handle is disposed in any suitable position convenient to the operation of the clutch device.

Rings 2 and 3 are preferably made in sections and connected by the bolts on which the rollers are mounted will comprise segmental units A and B. Any suitable means may be employed for connecting the segmental unitis A and B assembled about the pipe or conduit line. The connecting means is typified by a hook 32 pivoted on bolt 33 to each end of one of the segmental units and having a screw threaded tightening swivel connection 34, whereby the ends of segmental units may be tightly brought together in abutting relation when the hooks 32 are fitted over bolts 35 provided in the ends of the other segmental unit.

The annular gear 28 is attached to the side of rotary ring 6, preferably made in sections and attached together by links 36 fitting within cleats 37 on the adjacent ends of the sections. The rotary ring 6, or the sections thereof, is formed with a base part 38 having an annular fin 39 projecting from its outer peripheral wall. The side edges of the fin may be recesses to receive therein machined bearing rings 40. The fin provides an annular bearing surface or inner raceway for the rollers 5 mounted in the frame or casing member.

To the inner wall of the rotary ring are attached in spaced relation pairs of arms 41 and 42, each arm having its ends projecting out from opposite sides of the ring. About four pairs of these arms are disposed about the inner wall of the ring. Arms 41 are in the form of a round rod with a holding bracket 43 therefor having integral webs 44 for securing the bracket 43 to the inner wall of the rotary ring. Collars 44' are fixed to the arms 41 to bear against the bracket 43 and hold the arm in position. Arms 42 have an intermediate offset 45 to provide a recess 46 with side edges 47 for seating against the inner wall of the rotary ring with the side edges 47 fitting against the side edges of the rotary ring. Recesses 48 are provided for receiving bolts 49 by which the arms may be fixed to the rotary ring.

The arms 41 provide supports on which bracket 50 is mounted with the recess 51 of the bracket receiving the end of an arm 41. The bracket 50 is positioned upon the end of the arm 41 and rotatably secured in position by collars 52 fixed to the arm 41 and bearing against the bracket. A holder 53 is connected to the bracket 50 by a swivel connection composed of a stud 54 fitting in the socket 55 and secured by pin 56 bearing against washer 57. Holder 53 is provided with a seat 58 conforming with the seat 59 of holder 60 in which roll 61, preferably of rubber, is mounted on shaft 62. Seat 59 is provided with elongated recesses 63 to permit angular adjustment of the roller 61. Roller 61 is mounted on roller bearings C of conventional construction.

A rod 64 pivoted to bracket 50 at 64' extends to and through an opening 65' in the end of arm 42. Disposed between the bracket and arm about the rod 64 are a pair of springs 66 and 67 of different tension, spring 66 pressing the roller against the wrapped surface of the pipe and spring 67 preventing the roller from dropping away from the pipe when the roller is beneath the pipe line while being rotated thereabout. One end of spring 67 seats in the recess 65 formed in the end of arm 42 and the other end abutting against the bracket 50, around the knob 50' on the bracket 50 where the rod 64 is pivotally connected at 64'. The knob 50' and recess 65 hold the spring 67 in proper position and prevent its displacement. The smaller spring 66 is held in position within the hollow core of spring 67 by means of rod 64, which it surrounds. A pair of rollers 61 are associated with each pair of arms 41 and 42, one roller being on the ends of each pair of arms to assure proper balance of the wrapping device on the conduit line. The end of rod 64 may be screw-threaded or otherwise equipped to receive a cap or nut if desired to prevent disassembly of the parts when the wrapping device is removed from a pipe line.

One or more handles 68 and 69 may be attached to the stationary part of the device and projected in position on opposite sides for the operators of the device to lift or tilt the device on the conduit line.

At some convenient point a counterweight 70 may be provided opposite a supply roll supporting bracket 71 to counterbalance it. It may be conveniently secured to the inside wall of ring 6. The supply roll supporting mechanism can be conveniently secured in position by a bar 72 attached to ring 6. The roll carrying mechanism comprises a bracket having sides 73 and a cross piece 73', angularly adjustable on pivot 72' in relation to the bar 72 by means of elongated slots 74 into which securing bolts 75 on bar 72 project. One end of the bracket has a pin 76 extending between sides 73 on which the wrapping roll supply 77 is carried, and the other end of the bracket is provided with a roller 78 over which the wrapping material is first spread as it is being applied to the pipe body. Roller 78 is mounted in clips 79 attached to the sides 73 of the bracket.

The feed supply roll of wrapping material is disposed at the same angle to the pipe line as are the rollers 61. Thus as the rotary ring is actuated by the gear mechanism to revolve relatively to the stationary frame member, the device will move along the length of the pipe line with the fabric wrapping strip helically disposed and preferably lapped so that the pipe will be completely covered. The supply roll supporting bracket can be adjusted angularly to regulate the amount of overlap of the fabric being applied, or to apply it without any lap. The device is simple in construction and disposed to be adapted on pipe lines of different diameters without difficulty of adjustment. The small spring 66 keeps the rollers 61 continuously pressed against the pipe line, and the large springs 67 bear the weight of the machine and keep it automatically centered. The entire wrapping device is supported on the large springs.

In order to keep the supply reel from freely unwinding, an arm 80, pivoted at 81, may be conveniently pressed against the roll by means of springs 82, one end of which engages the side 73 of the reel support and the other end engages some part of the arm 80. The springs are kept under torsional strain to continuously press the arm 80 against the supply roll. A link 83 may also be connected to hooks 84 and 85 disposed respectively on the arm 72 and arm 80 for holding the arm 80 back out of position when supply roll 77 is changed.

Having described and illustrated our invention, we claim:

1. A pipe wrapping machine comprising a frame, a ring adapted to surround the pipe and rotatably mounted on the frame, traction rollers mounted on the ring and angularly disposed with respect to direction of travel, a reel of wrapping material supported on the ring in advance of the traction rollers, and a means on the frame for revolving the ring in such direction as to cause the traction rollers to move about the wrapped pipe.

2. A pipe wrapping machine comprising a frame, a ring adapted to surround the pipe and rotatably mounted on the frame, traction rollers mounted on the ring and angularly disposed with respect to direction of travel, resilient means betwen the traction rollers and ring to resiliently support the frame and ring, a reel of wrapping material supported on the ring in advance of the traction rollers, and a means on the frame for revolving the ring in such direction as to cause the traction rollers to move about the wrapped pipe.

3. A pipe wrapping machine comprising a frame, a ring adapted to surround the pipe and rotatably mounted on the frame, traction rollers mounted on each side of the ring and angularly disposed with respect to the direction of travel, a reel of wrapping material on the ring in advance of the traction rollers, and means on the frame for revolving the ring in such direction as to cause the traction rollers to move about the wrapped pipe.

4. A pipe wrapping machine comprising a frame, a ring adapted to surround the pipe and rotatably mounted on the frame, traction rollers disposed circumferentially about and pivoted to the ring to form an opening for receiving a pipe line and angularly disposed with respect to direction of travel, a reel of wrapping material on the ring in advance of the traction rollers, spring means for actuating the rollers against the pipe line for resiliently supporting the machine in centered position on the pipe line, and means on the frame for revolving the ring in such direction as to cause the traction rollers to move about the wrapped pipe line.

5. A pipe wrapping machine comprising a frame, a ring adapted to surround the pipe and rotatably mounted on the frame, a pair of arms mounted on the ring, a traction roller mounted on each end of the arm of one pair and angularly disposed with respect to direction of travel, spring means connected with the end of the other arm of the pair and pressing the rollers against the pipe line, a reel of wrapping material on the ring in advance of the traction rollers, and means on the frame for rotating the ring in such direction as to cause the traction rollers to move about the wrapped pipe line.

6. A pipe wrapping machine comprising a frame, a ring rotatably mounted on said frame and surrounding a pipe, traction rollers mounted on opposite sides of the ring and disposed at an angle to the direction of travel, a wrapping reel on the ring in advance of the traction rollers, a motor on the frame, and driving mechanism connecting the motor to the ring for driving said ring in such direction as to cause the traction rollers to move about the wrapped pipe.

7. A pipe wrapping machine comprising a frame, a ring rotatably mounted on said frame and surrounding a pipe, traction rollers mounted on the ring and angularly disposed with respect to the direction of travel, a reel of wrapping material supported on the ring in advance of the rollers, and springs interposed between the rollers and ring for resiliently supporting the frame and ring upon the rollers and means on the frame for driving the ring in such direction as to cause the traction rollers to move about the wrapped pipe.

8. A pipe wrapping machine comprising a frame, a ring rotatably mounted on said frame and surrounding a pipe, traction rollers pivotally connected to and disposed on each side of the ring at an angle to the direction of travel, a reel support mounted on the ring, springs interposed between the rollers and ring for resiliently supporting the ring and frame upon the rollers, and motor means on the frame connected to the ring for driving same in such direction as to cause the traction rollers to move about the wrapped pipe.

9. A pipe wrapping machine comprising a frame, a ring rotatably mounted on the frame and surrounding a pipe, traction rollers pivotally connected to and disposed about the pipe on opposite sides of the ring at an angle to the direction of travel, a reel support for wrapping material mounted on the ring and axially spaced therefrom, means for adjusting the angle of the rollers in respect to the pipe, springs interposed between the rollers and ring for resiliently supporting the ring and frame upon the rollers, and means on the frame for rotating the ring around the pipe in such direction as to cause the wrapping material to be applied and for the traction rollers to move about the wrapped pipe.

10. A pipe wrapping machine comprising a frame, a ring rotatably connected to the frame about the pipe, traction rolls pivoted to the ring and disposed about the pipe on opposite sides of the ring at an angle to the direction of travel, a reel mounted on the ring for applying wrapping about the pipe, means for adjusting the angle of the rollers in respect to the pipe, means for adjusting the angle of the reel in respect to the pipe, resilient means connected to the traction rollers and ring for resiliently supporting said ring and frame upon the rollers, and means on the frame for revolving the ring in such direction as to cause the traction rollers to move about the wrapped pipe.

11. A pipe wrapping machine comprising a frame and ring rotatably mounted to the frame, arms disposed about the pipe and projecting from opposite sides of the ring, traction rollers pivoted to the arms on each side of the ring and angularly disposed to the direction of travel, resilient means connected to the rollers and the ring for resiliently supporting the ring and frame, a reel mounted on the ring for supplying wrapping material to the pipe as the ring is rotated, and means on the frame for revolving the ring in such direction as to cause the traction rollers to move about the wrapped pipe.

12. A pipe wrapping unit for wrapping pipe lines comprising a frame support adapted to be moved along a pipe line, traction rollers for supporting the frame support on and causing same to travel along the pipe, a series of rollers on the frame disposed about the pipe, an annular ring surrounding the pipe and rotatably connected to the frame within an orbit described by the series of rollers bearing against the outer peripheral wall of the ring, a bar or arm projecting from one side of the ring, a bracket pivotally connected to said bar or arm, a reel mounted on the bracket for supplying wrapping material, a common prime mover on the frame support for driving the traction rollers to move the unit along the pipe line and to rotate the ring within the orbit described by the series of rollers, driving connections between the prime mover and the driven ring and the traction rollers whereby same are driven from the common prime mover, said driving connections for the ring comprising gear teeth on the outer peripheral wall of the ring, a toothed gear wheel meshing with the teeth on the annular ring, a shaft on which the gear wheel and a sprocket are mounted, and a clutch means mounted on the shaft between the toothed gear wheel and sprocket to connect and disconnect the motor.

ANTHONY J. PFOHL.
CHARLES M. WOOD.